(12) United States Patent
Davis

(10) Patent No.: US 11,111,620 B2
(45) Date of Patent: Sep. 7, 2021

(54) WASHING MACHINE APPLIANCE WITH DOVETAIL FOAM DAMPING ASSEMBLY

(71) Applicant: Haier US Appliance Solutions, Inc., Wilmington, DE (US)

(72) Inventor: Paul Owen Davis, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 186 days.

(21) Appl. No.: 16/404,943

(22) Filed: May 7, 2019

(65) Prior Publication Data

US 2020/0354876 A1 Nov. 12, 2020

(51) Int. Cl.
*D06F 37/26* (2006.01)
*F16F 15/02* (2006.01)
*D06F 37/24* (2006.01)

(52) U.S. Cl.
CPC ............ *D06F 37/268* (2013.01); *D06F 37/24* (2013.01); *F16F 15/022* (2013.01)

(58) Field of Classification Search
CPC ....... D06F 37/24; D06F 37/268; F16F 15/022
See application file for complete search history.

(56) References Cited

U.S. PATENT DOCUMENTS

| | | | |
|---|---|---|---|
| 4,934,493 A | 6/1990 | Bauer et al. | |
| 4,946,008 A | 8/1990 | Bauer et al. | |
| 5,946,946 A | 9/1999 | Sharp et al. | |
| 8,727,082 B2 | 5/2014 | Dillmann et al. | |
| 9,797,081 B2 | 10/2017 | Miller et al. | |
| 9,963,814 B2 | 5/2018 | Kim et al. | |
| 2014/0110201 A1 | 4/2014 | Peuker et al. | |
| 2015/0191860 A1 | 7/2015 | Sim et al. | |
| 2016/0024705 A1 | 1/2016 | Hernden et al. | |
| 2017/0356520 A1* | 12/2017 | Bauer | F16F 9/36 |
| 2018/0231089 A1 | 8/2018 | Bauer et al. | |

FOREIGN PATENT DOCUMENTS

| | | |
|---|---|---|
| EP | 2852776 B1 | 5/2016 |
| JP | 2000279690 A | 10/2000 |
| WO | WO2014158493 A1 | 10/2014 |
| WO | WO2017015331 A1 | 1/2017 |
| WO | WO2017212389 A1 | 12/2017 |
| WO | WO2017218531 A1 | 12/2017 |

\* cited by examiner

*Primary Examiner* — Joseph L. Perrin
(74) *Attorney, Agent, or Firm* — Dority & Manning, P.A.

(57) ABSTRACT

A dampening suspension assembly for a washing machine appliance is provided. The washing machine appliance has a cabinet and a tub mounted within the cabinet. The dampening suspension assembly includes a suspension rod extending between the tub and the cabinet. The dampening suspension assembly also includes a foam damper assembly circumferentially surrounding a portion of the suspension rod. The foam damper assembly includes a capsule, a first foam friction element disposed in a first trough of the capsule, and a second foam friction element disposed in a second trough of the capsule radially opposite the first foam friction element. The first foam friction element is compressed between opposing sidewalls of the first trough and is compressed against the suspension rod. The second foam friction element is compressed between opposing sidewalls of the second trough and is compressed against the suspension rod.

16 Claims, 7 Drawing Sheets

WASHING MACHINE APPLIANCE WITH DOVETAIL FOAM DAMPING ASSEMBLY

FIELD OF THE INVENTION

The present subject matter relates generally to washing machine appliances, such as vertical axis washing machine appliances, and damping assemblies for such washing machine appliances.

BACKGROUND OF THE INVENTION

Washing machine appliances generally include a cabinet that receives a tub for containing wash and rinse water. A wash basket is rotatably mounted within the wash tub. A drive assembly is coupled to the wash tub and configured to rotate the wash basket within the wash tub in order to cleanse articles within the wash basket. Upon completion of a wash cycle, a pump assembly can be used to rinse the articles and drain soiled water to a draining system.

Washing machine appliances include vertical axis washing machine appliances and horizontal axis washing machine appliances, where "vertical axis" and "horizontal axis" refer to the axis of rotation of the wash basket within the wash tub. Vertical axis washing machine appliances typically have the wash tub suspended in the cabinet with damping devices. Some damping devices include a continuous cylindrical shell with a cylindrical piece of foam contained within the shell.

The use of such cylindrical foam elements may present certain difficulties. For example, the foam material is generally a thermal insulator and, as such, does not efficiently dissipate heat which can be generated during use, e.g., due to friction between the foam material and the suspension rod when there is relative motion. As another example, uniform compression of such cylindrical foam pieces may be difficult to achieve in practice, which can make analysis or prediction of the damping device's performance more difficult or complex.

Accordingly, improved damping devices in washing machine appliances are desired. In particular, foam damping devices which provide uniform compression of the foam and which minimize the overall volume of the foam would be advantageous.

BRIEF DESCRIPTION OF THE INVENTION

In accordance with one embodiment of the present disclosure, a dampening suspension assembly for a washing machine appliance is provided. The washing machine appliance has a cabinet and a tub mounted within the cabinet. The dampening suspension assembly includes a suspension rod extending along an axial direction between the tub and the cabinet. The suspension rod defines a radial direction perpendicular to the axial direction and a circumferential direction extending around the axial direction. The dampening suspension assembly also includes a foam damper assembly circumferentially surrounding a portion of the suspension rod. The foam damper assembly includes a capsule, a first foam friction element disposed in a first trough of the capsule, and a second foam friction element disposed in a second trough of the capsule. The second foam friction element is opposite the first foam friction element along the radial direction. The first foam friction element is compressed between opposing sidewalls of the first trough along the circumferential direction and is compressed against the suspension rod along the radial direction. The second foam friction element is compressed between opposing sidewalls of the second trough along the circumferential direction and is compressed against the suspension rod along the radial direction.

In another aspect of the present disclosure, a washing machine appliance is provided. The washing machine appliance includes a cabinet and a tub mounted within the cabinet by a dampening suspension assembly. The dampening suspension assembly includes a suspension rod extending along an axial direction between the tub and the cabinet. The suspension rod defines a radial direction perpendicular to the axial direction and a circumferential direction extending around the axial direction. The dampening suspension assembly also includes a foam damper assembly circumferentially surrounding a portion of the suspension rod. The foam damper assembly includes a capsule, a first foam friction element disposed in a first trough of the capsule, and a second foam friction element disposed in a second trough of the capsule. The second foam friction element is opposite the first foam friction element along the radial direction. The first foam friction element is compressed between opposing sidewalls of the first trough along the circumferential direction and is compressed against the suspension rod along the radial direction. The second foam friction element is compressed between opposing sidewalls of the second trough along the circumferential direction and is compressed against the suspension rod along the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
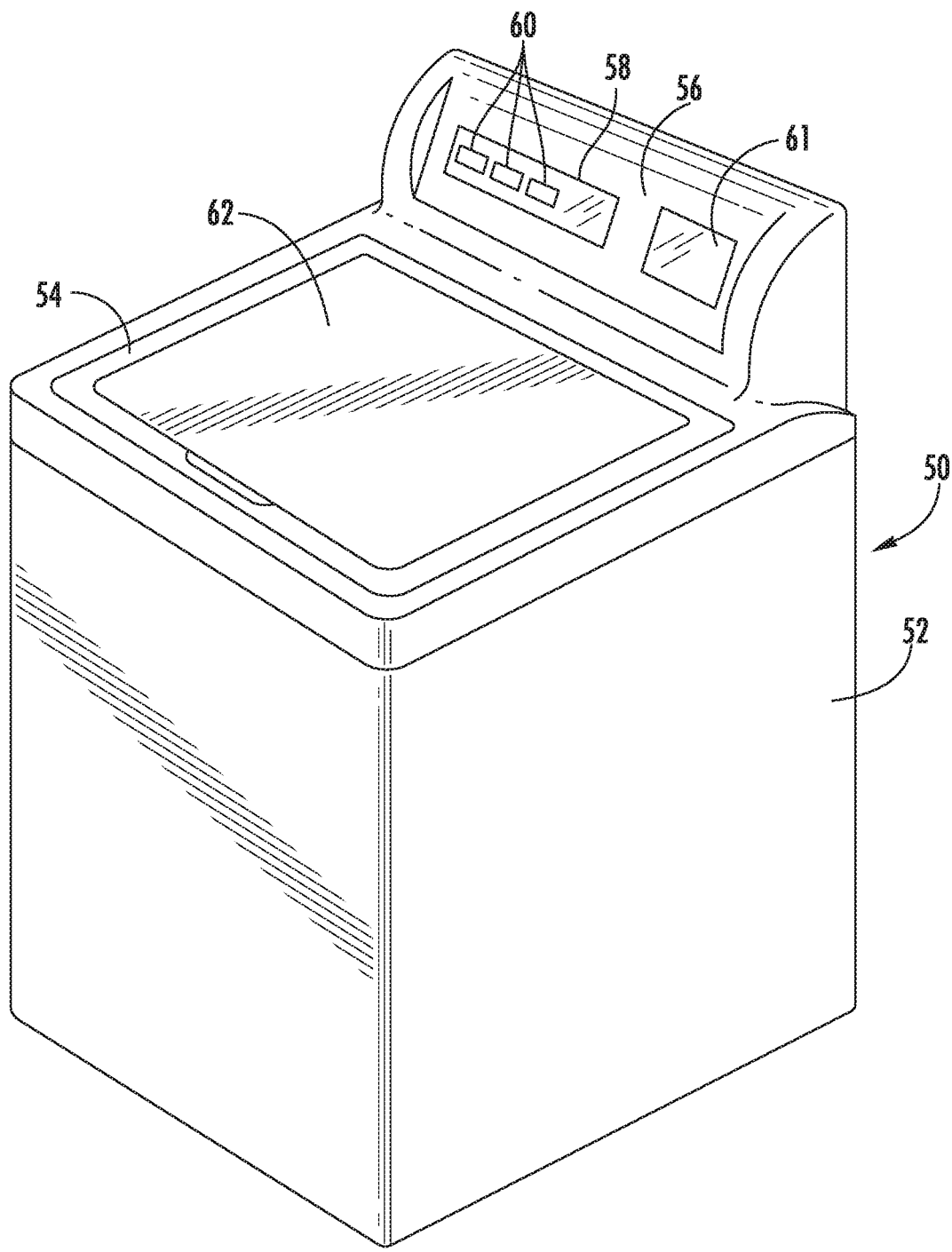
FIG. 1 provides a perspective view of a washing machine appliance in accordance with one or more exemplary embodiments of the present disclosure.

Reference now will be made in detail to embodiments of the invention, one or more examples of which are illustrated in the drawings. The detailed description uses numerical and letter designations to refer to features in the drawings. Like or similar designations in the drawings and description have been used to refer to like or similar parts of the disclosure. Each example is provided by way of explanation of the invention, not limitation of the invention. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise. As used herein, the terms "first," "second," and "third" may be used interchangeably to distinguish one component from another and are not intended to signify location or importance of the individual components.

FIG. 1 provides a perspective view of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58, including a plurality of input selectors 60, is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 (FIG. 2) located within cabinet 52, and a closed position (shown in FIG. 1) forming an enclosure over wash tub 64.

As illustrated in FIG. 1, washing machine appliance 50 is a vertical axis washing machine appliance. While the present disclosure is discussed with reference to a vertical axis washing machine appliance, those of ordinary skill in the art, using the disclosures provided herein, should understand that the subject matter of the present disclosure is equally applicable to other washing machine appliances.

Figure 2:
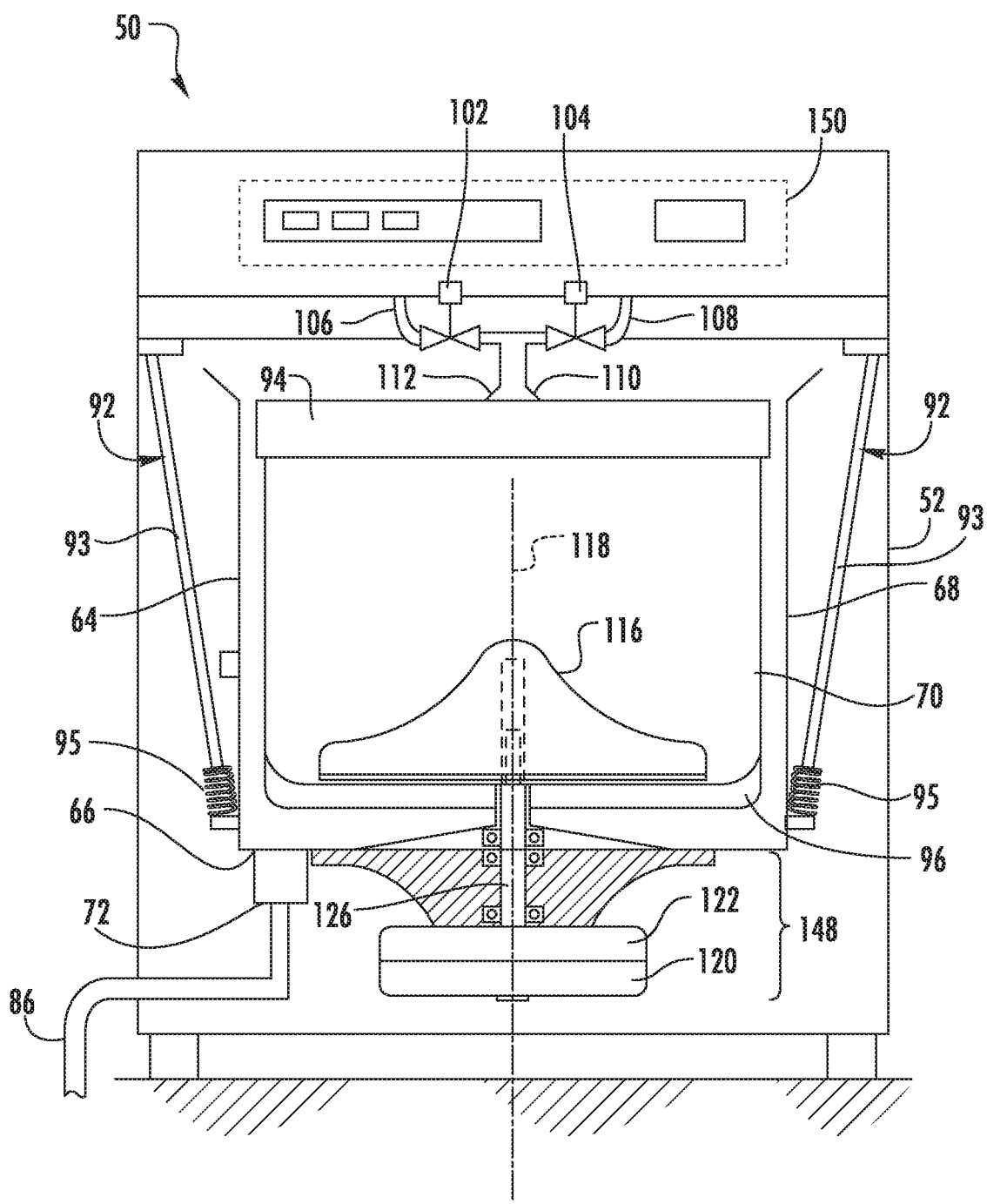
FIG. 2 provides a front elevation schematic view of various components of the washing machine appliance of FIG. 1.

FIG. 2 provides a front elevation schematic view of certain components of an example washing machine appliance 50 including a wash tub 64 and a basket 70 rotatably mounted within wash tub 64. Wash tub 64 includes a bottom wall 66 and a sidewall 68. A pump assembly 72 is located beneath tub 64 and basket 70 for gravity assisted flow when draining tub 64. A pump inlet hose 80 extends from the wash tub 64, e.g., from the bottom wall 66 thereof, to the pump assembly 72, and a pump outlet hose 86 extends from the pump assembly 72 to a building plumbing system discharge line (not shown).

As may be seen in FIG. 2, the wash basket 70 is movably disposed and rotatably mounted in wash tub 64 in a spaced apart relationship from tub side wall 68 and tub bottom wall 66. Basket 70 includes a plurality of perforations therein to facilitate fluid communication between an interior of basket 70 and wash tub 64.

A hot liquid valve 102 and a cold liquid valve 104 deliver liquid, such as water, to basket 70 and wash tub 64 through a respective hot liquid hose 106 and a cold liquid hose 108. Liquid valves 102, 104 and liquid hoses 106, 108 together form a liquid supply connection for washing machine appliance 50 and, when connected to a building plumbing system (not shown), provide a fresh water supply for use in washing machine appliance 50. Liquid valves 102, 104 and liquid hoses 106, 108 are connected to a basket inlet tube 110, and liquid is dispersed from inlet tube 110 through a nozzle assembly 112 having a number of openings therein to direct washing liquid into basket 70 at a given trajectory and velocity. A dispenser (not shown in FIG. 2), may also be provided to produce a liquid or wash solution by mixing fresh water with a detergent and/or other additive for cleansing of articles in basket 70.

Still referring to FIG. 2, an agitation element 116, such as a vane agitator, impeller, auger, or oscillatory basket mechanism, or some combination thereof, is disposed in basket 70 to impart an oscillatory motion to articles and liquid in basket 70. In various exemplary embodiments, agitation element 116 may be a single action element (oscillatory only), double action (oscillatory movement at one end, single direction rotation at the other end) or triple action (oscillatory movement plus single direction rotation at one end, single direction rotation at the other end). As illustrated, agitation element 116 is oriented to rotate about a vertical axis 118.

Basket 70 and agitation element 116 are driven by a motor 120 through a transmission and clutch system 122. The motor 120 drives shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred to herein as a motor assembly 148.

Basket 70, tub 64, and machine drive system 148 are supported by a vibration dampening suspension system. The dampening suspension system generally operates to dampen dynamic motion as the wash basket 70 rotates within the tub 64. The dampening suspension system can include one or more suspension assemblies 92 coupled between and to the cabinet 52 and wash tub 64. Typically, four suspension assemblies 92 are utilized, and are spaced apart about the wash tub 64. For example, each suspension assembly 92 may include a suspension rod 93 connected at one end proximate a corner of the cabinet 52 and at an opposite end to the wash tub 64. The opposite end of the suspension rod 93 connected to the wash tub 64 may be surrounded, e.g., encircled, by a suspension spring 95 and may further be enclosed by a foam damper assembly 200 (FIG. 3) between the suspension rod 93 and the suspension spring 95.

In addition to the vibration dampening suspension assemblies 92, the washer can include other vibration dampening elements, such as a balance ring 94 disposed around the upper circumferential surface of the wash basket 70. The balance ring 94 can be used to counterbalance an out of balance condition for the wash machine as the basket 70 rotates within the wash tub 64. The wash basket 70 could also include a balance ring 96 located at a lower circumferential surface of the wash basket 70.

Operation of washing machine appliance 50 is controlled by a controller 150 that is operatively coupled to the user interface input located on washing machine backsplash 56 (shown in FIG. 1) for user manipulation to select washing machine cycles and features. In response to user manipulation of the user interface input, controller 150 operates the various components of washing machine appliance 50 to execute selected machine cycles and features.

Controller 150 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 (such as motor assembly 148) may be in communication with controller 150 via one or more signal lines or shared communication busses to provide signals to and/or receive signals from the controller 150.

In an illustrative embodiment, laundry items are loaded into basket 70, and washing operation is initiated through operator manipulation of control input selectors 60 (shown in FIG. 1). Tub 64 is filled with liquid such as water and mixed with detergent to form a wash fluid, and basket 70 is agitated with agitation element 116 for cleansing of laundry items in basket 70. For example, agitation element 116 may be moved back and forth in an oscillatory back and forth motion about vertical axis 118, while basket 70 remains generally stationary (i.e., not actively rotated). Such oscillatory motion may be obtained in different embodiments with a reversing motor, a reversible clutch, or other known reciprocating mechanism. After the agitation phase of the wash cycle is completed, tub 64 is drained with pump assembly 72. Laundry articles can then be rinsed by again adding liquid to tub 64. Depending on the particulars of the cleaning cycle selected by a user, agitation element 116 may again provide agitation within basket 70. After a rinse cycle, tub 64 is again drained, such as through use of pump assembly 72. After liquid is drained from tub 64, one or more spin cycles may be performed. In particular, a spin cycle may be applied after the agitation phase and/or after the rinse phase in order to wring excess wash fluid from the articles being washed. During a spin cycle, basket 70 is rotated at relatively high speeds about vertical axis 118, such as between approximately 450 and approximately 1300 revolutions per minute.

While described in the context of specific embodiments of washing machine appliance 50, using the teachings disclosed herein it will be understood that washing machine appliance 50 is provided by way of example only. Other washing machine appliances having different configurations (such as vertical and/or horizontal-axis washing machine appliances), different appearances, and/or different features may also be utilized with the present subject matter as well.

Figure 3:
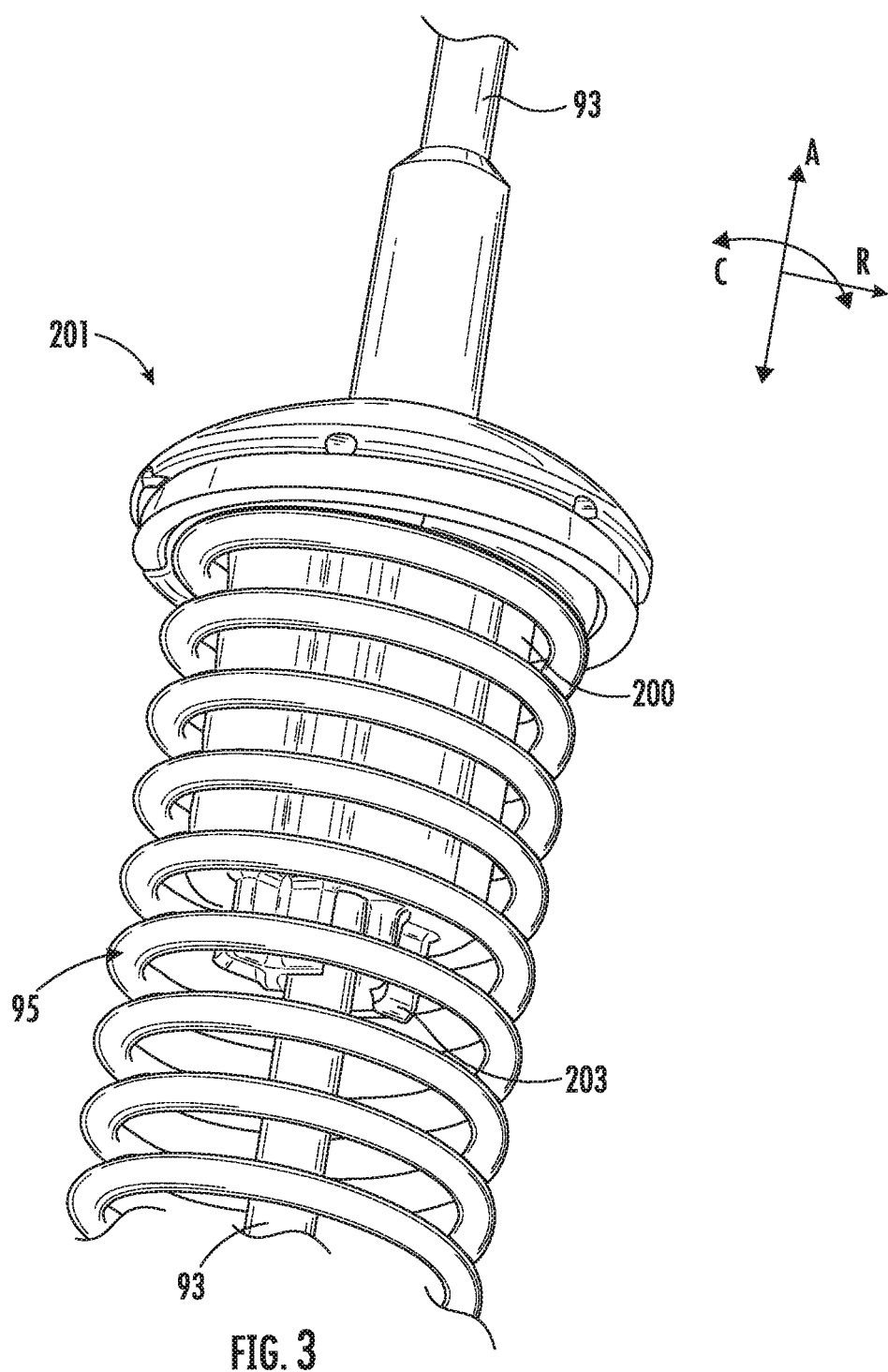
FIG. 3 provides a perspective view of a portion of a vibration dampening suspension system in accordance with one or more exemplary embodiments of the present disclosure.

FIG. 3 provides an enlarged view of a portion of a vibration dampening suspension system such as may be incorporated into the washing machine appliance 50 of FIGS. 1 and 2. As shown in FIG. 3, the suspension rod 93 extends along an axial direction A, e.g., between the tub 64 and the cabinet 52 of the washing machine appliance 50 (FIG. 2). The suspension rod 93 also defines a radial direction R perpendicular to the axial direction A and a circumferential direction C extending around the axial direction A. As may be seen in FIG. 3, a foam damper assembly 200 may circumferentially surround an axial portion of the suspension rod 93, e.g., the entire circumference of the suspension rod 93 may be enclosed within the foam damper assembly 200 and a portion of the axial length of the suspension rod 93 may be enclosed within the foam damper assembly 200. The foam damper assembly 200 may include one or more foam friction elements 202 (FIG. 4) which frictionally engage the suspension rod 93 and thereby dampen vibrations which may otherwise be transferred from the tub 64 to the cabinet 52, such as vibrations due to rotation of the basket 70 within the tub 64.

Figure 4:
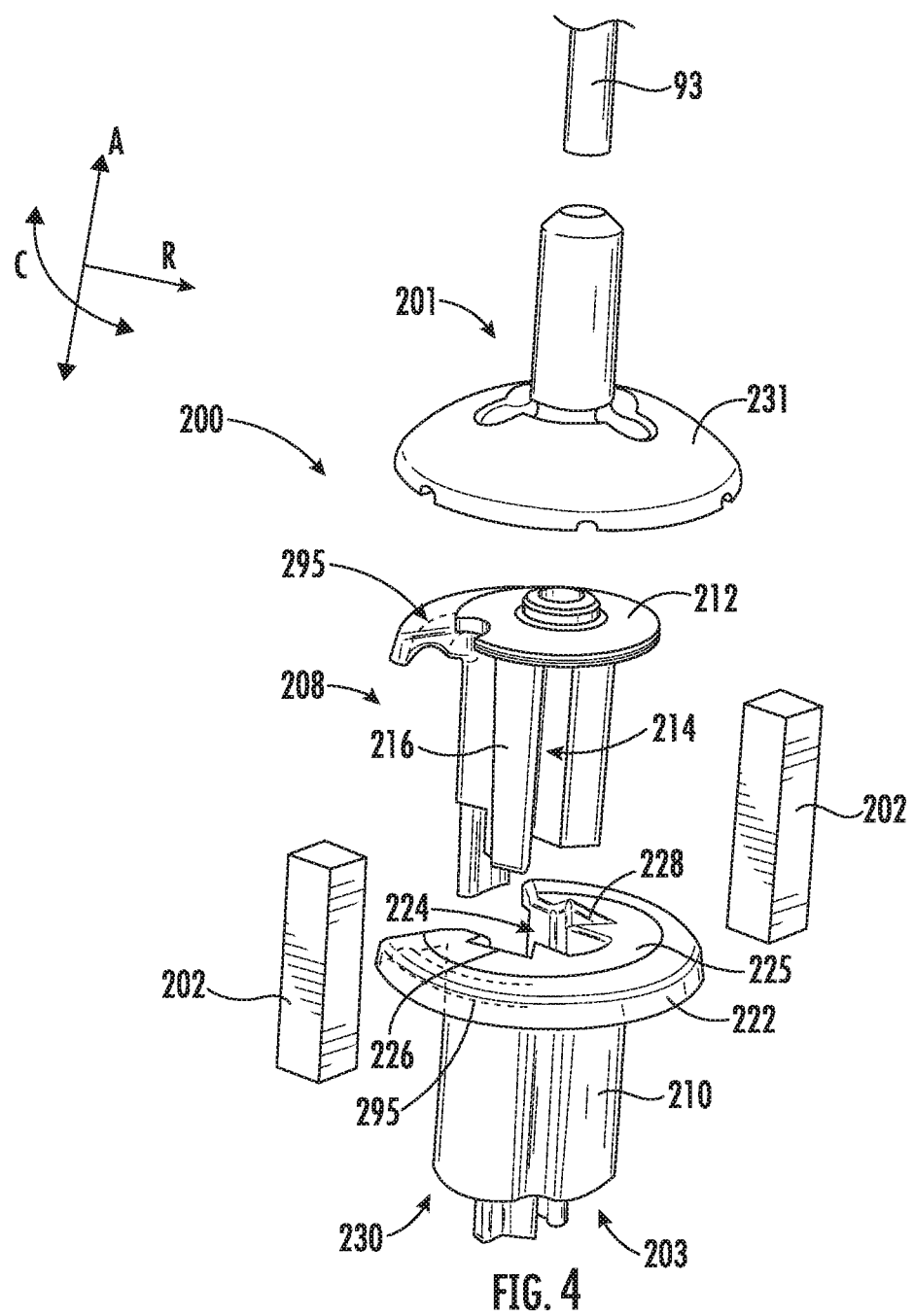
FIG. 4 provides an exploded view of a foam damper assembly in accordance with one or more exemplary embodiments of the present disclosure.
Figure 5:
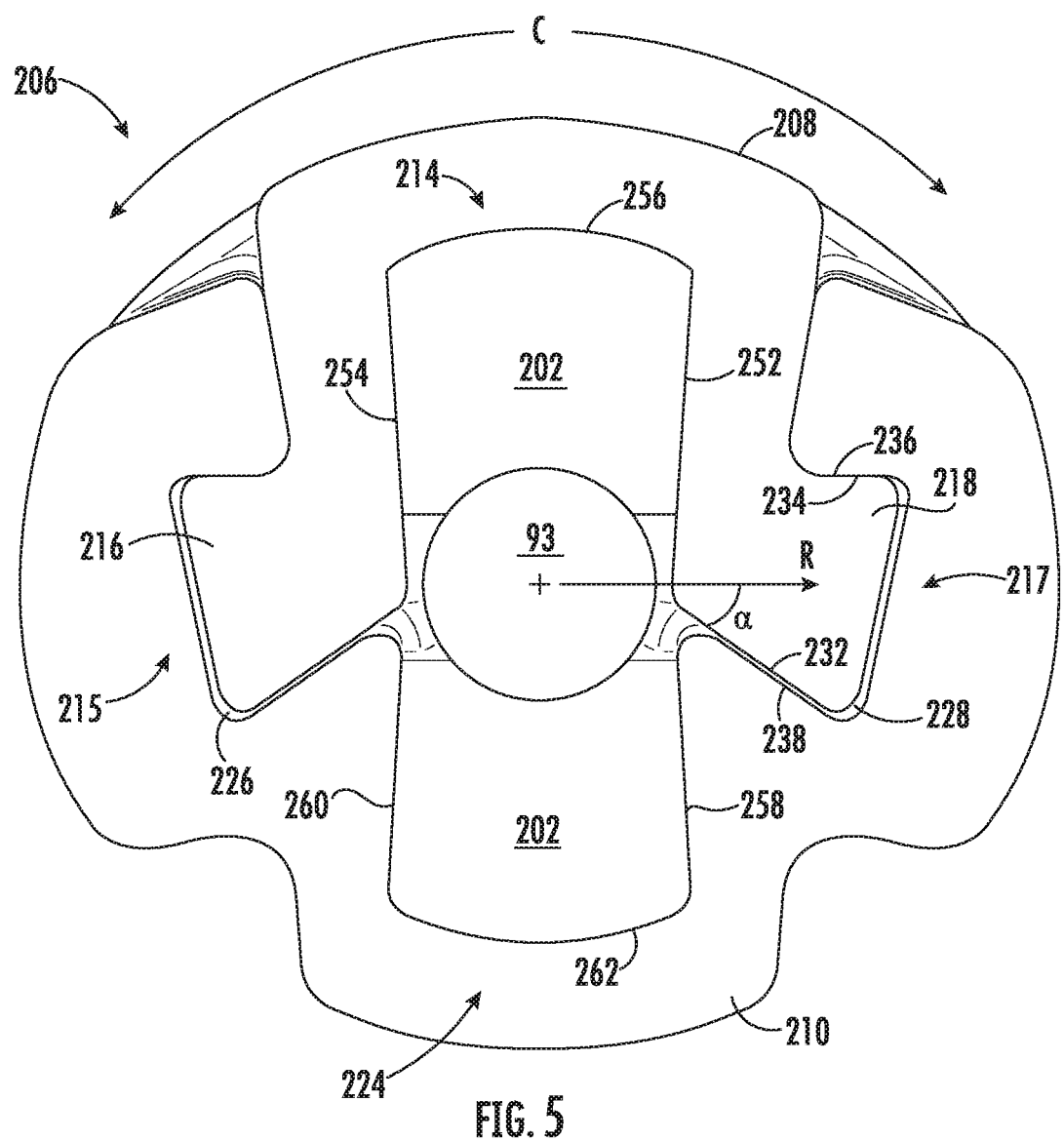
FIG. 5 provides a cross-section view of the foam damper assembly of FIG. 4.
Figure 6:
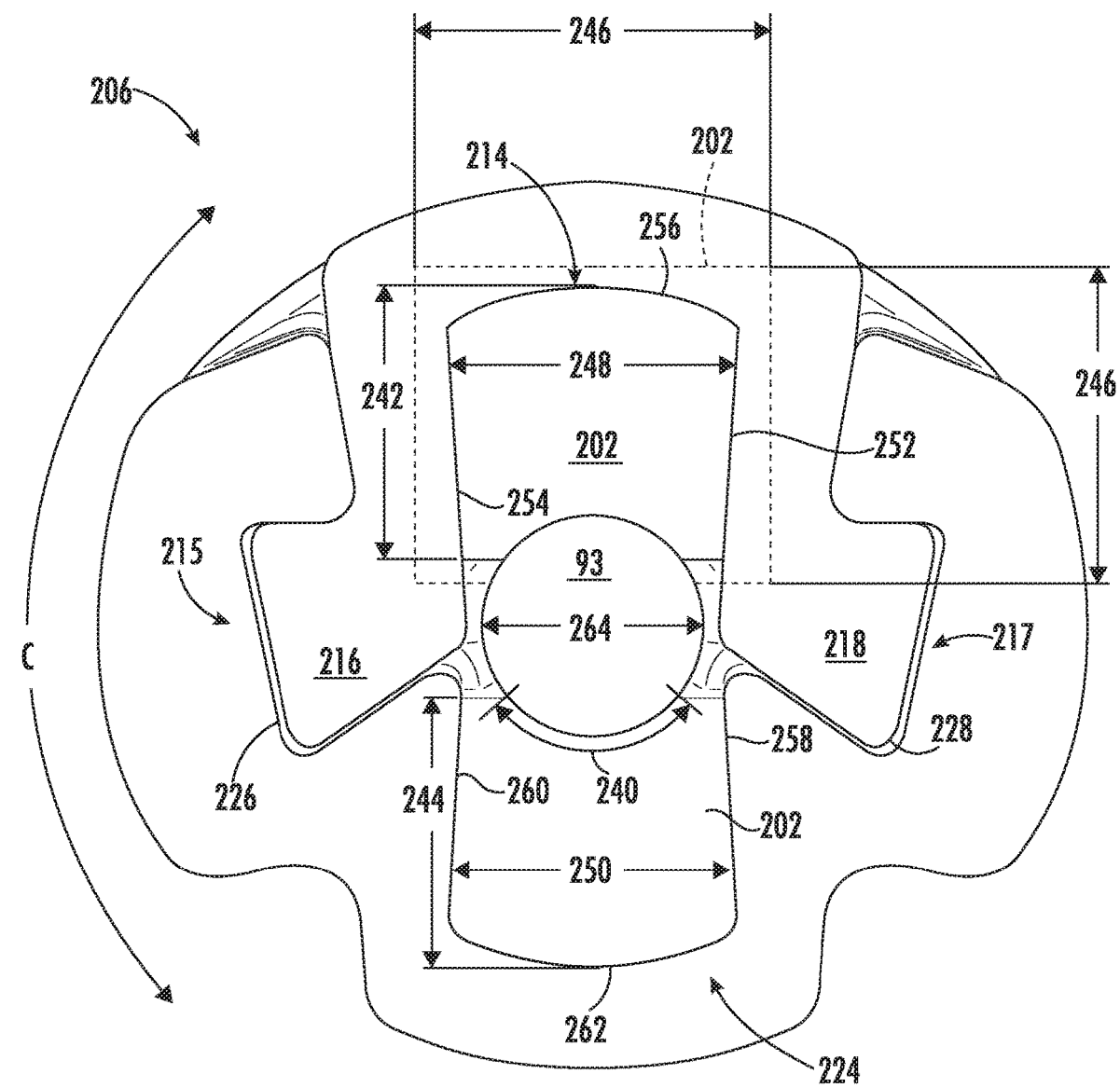
FIG. 6 provides a cross-section view of the foam damper assembly of FIG. 4.

Turning now to FIGS. 4 through 6, various components of the foam damper assembly 200 according to one or more exemplary embodiments are illustrated. As illustrated in FIGS. 4 through 6, the foam damper assembly 200 may include, in some embodiments, a capsule 206 which contains one or more foam friction elements 202 and maintains such foam friction elements 202 in a compressed state against the suspension rod 93.

In particular embodiments, the capsule 206 may include a first capsule portion 208 and a second capsule portion 210. The first capsule portion 208 and the second capsule portion 210 may be releasably interlocked. For example, as illustrated in FIGS. 4 through 6, the first capsule portion 208 and the second capsule portion 210 may be movable relative to one another along the axial direction A and may be interlockable by at least one dovetail joint, such as a first dovetail joint 215 (FIG. 5) and a second dovetail joint 217 (FIG. 5). As may be seen in FIGS. 4 through 6, the first dovetail joint 215 may include a first male dovetail 216 on the first capsule portion 208 and a first female dovetail 226 on the second capsule portion 210. Similarly, the second dovetail joint 217 may include a second male dovetail 218 on the first capsule portion 208 and a second female dovetail 228 on the second capsule portion 210. As best seen in FIG. 5, the first male dovetail 216 and the second male dovetail 218 may be positioned diametrically opposite one another on the first capsule portion 208 along the radial direction R, while the first female dovetail 226 and the second female dovetail 228 may be positioned diametrically opposite one another on the second capsule portion 210 along the radial direction R. As best seen in FIG. 4, the dovetails 216, 218, 226, and 228 may be oriented generally along the axial direction A. The dovetails 216, 218, 226, and 228 may be tapered along the axial direction A. Such tapers may provide low assembly force with a tight final fit. For example, the tapered shape of the dovetails may produce a wedging action between the first and second capsule portions 208 and 210 that prevents relative motion between the first and second capsule portions 208 and 210 because of the contact pressure at the abutting surfaces.

In some exemplary embodiments, the first and second capsule portions 208 and 210 may be formed of a plastic material, such as by injection molding. The first and second capsule portions 208 and 210 may be particularly suited for injection molding because the tapers of the dovetails 216, 218, 226, and 228 may advantageously allow large draft angles and the nesting configuration of the flanges 212 and 222 avoids undercuts. In other embodiments, any suitable material and/or method of manufacture may be employed, such as but not limited additive manufacturing techniques using metal and/or plastic materials.

The capsule 206 may include a first trough 214 and a second trough 224. For example, as illustrated in FIGS. 4 through 6, in some embodiments, the first trough 214 may be defined in the first capsule portion 208 and the second trough 224 may be defined in the second capsule portion 210. As best seen in FIGS. 5 and 6, when assembled the foam damper assembly 200 may include a first foam friction element 202 disposed in the first trough 214 of the capsule 206 and a second foam friction element 202 disposed in the second trough 224 of the capsule 206. In some embodiments, for example as shown in FIGS. 5 and 6, the second foam friction element 202 may be opposite the first foam friction element 202 along the radial direction, e.g., the foam friction elements 202 may be diametrically opposite one another on opposing sides of the suspension rod 93.

In some embodiments, the dovetail joints 215 and 217 may be oblique to the suspension rod 93. For example, as illustrated in FIG. 5, the or each male dovetail, e.g., second male dovetail 218 may include a front surface 232 which is distal from the first trough 214 and proximate to the second capsule portion 210 and an opposing back surface 234 which is proximate to the first trough 214 and distal from the second capsule portion 210. In some embodiments, one or both of the front surface 232 and the back surface 234 may be oblique to the suspension rod 93, such as oblique to the radial direction R. For example, as illustrated in FIG. 5, the front surface 232 of the male dovetail, e.g., of one or both of the first and second male dovetails 216 and 218, may be oriented at an angle α to the radial direction R. Also illustrated for example in FIG. 5 are a front surface 236 and a back surface 238 of the female dovetail, e.g., one or both of the first and second female dovetails 226 and 228, where the front surface 236 is proximate the first capsule portion 208 and distal from the second trough 224 while the back surface 238 is distal from the first capsule portion 208 and proximate to the second trough 224. The front surface 236 of the female dovetail may be configured to mate with the back surface 234 of the male dovetail and the back surface 238 of the female dovetail may be configured to mate with the front surface 232 of the male dovetail. For example, as illustrated in FIG. 5, in embodiments where the front surface 232 of the male dovetail is oblique to the suspension rod 93, e.g., forms the angle α with the radial direction R, the back surface 238 of the female dovetail may also be oriented at the angle α with the radial direction R.

As may be seen in FIGS. 2-4, the foam damper assembly 200 extends along the axial direction A from a top portion 201 to a bottom portion 203. For example, the top portion 201 may be proximate the cabinet 52 of the washing machine appliance 50 along the axial direction A and the bottom portion 203 may be opposite the top portion 201 and proximate the tub 64 of the washing machine appliance 50 along the axial direction A. For example, the top portion 201 of the foam damper assembly 200 may be closer to the end of the suspension rod 93 which is connected to the cabinet 52 and the bottom portion 203 of the foam damper assembly 200 may be closer to the opposite end of the suspension rod 93 which is connected to the wash tub 64.

The foam friction elements 202 may be completely enclosed within the damper assembly 200 when the damper assembly 200 is assembled. For example, the top portion 201 may be defined by or include a cap 231 which encloses the capsule 206. In some embodiments, the first capsule portion 208 may include a first upper flange 212 and the second capsule portion 210 may include a second upper flange 222 configured to mate with the first upper flange 212 above the foam friction elements 202 to enclose the foam friction elements 202 within the capsule 206 at the top. For example, the second upper flange 222 may include a recess 225 formed therein which is configured to receive the first upper flange 212 of the first capsule portion 208. Flanges 212 and 222 may together provide a spring seat 295 that concentrically engages the top coil of spring 95 so that the spring 95 supports the weight of the tub 64 that is resting on the top surface of the cap 231. As shown in FIG. 4, the capsule 206, e.g., the second capsule portion 210 thereof, may include a bottom wall 230 at or near the bottom portion 203 of the capsule 206 below the foam friction elements 202 and the bottom wall 230 may seal off and/or enclose the foam friction elements 202 within the capsule 206 at the bottom. In some embodiments, lubricant and/or thermal grease may be provided within the capsule 206 and such enclosure may contribute to containing the lubricant and/or thermal grease within the capsule 206.

As mentioned above, the dovetails 216, 218, 226, and 228 may be tapered. For example, as may be seen in FIG. 4, the male dovetails 216 and 218 and the female dovetails 226, 228 may be tapered along the axial direction A towards the bottom portion 203 of the foam damper assembly 200. For example, the dovetails 216, 218, 226, and 228 may each define a width generally along the circumferential direction C, and the width of each dovetail 216, 218, 226, and 228 may decrease along the axial length of the dovetail 216, 218, 226, and 228 towards the bottom portion 203 of the foam damper assembly 200. The wedging action mechanically locks the first and second capsule portions 208 and 210 together to effectively form a continuous circumferential structure, analogous to a barrel hoop, that resists and contains the pressure of the compressed foam friction elements 202, thereby maintaining the intended dimensions.

As best seen in FIGS. 5 and 6, the first trough 214 may include a first sidewall 252 extending generally along the radial direction R and a second sidewall 254 extending generally along the radial direction R. The first and second sidewalls 252 and 254 of the first trough 214 may be spaced apart along the circumferential direction C and connected by a back wall 256 of the first trough 214. The first foam friction element 202 may be compressed between the opposing sidewalls 252 and 254 of the first trough 214 along the circumferential direction C. The first foam friction element 202 may be compressed against the suspension rod 93 along the radial direction R, such as between the suspension rod 93 and the back wall 256 of the first trough 214. Similarly, the second foam friction element 202 may be compressed between opposing sidewalls 258 and 260 of the second trough 224 along the circumferential direction C and may be compressed against the suspension rod 93 along the radial direction R, e.g., between the suspension rod 93 and the back wall 262 of the second trough 224. For example, the foam friction elements 202 may each be compressed against the suspension rod 93 along a portion 240 (FIG. 6) of the circumference of the suspension rod 93. As may be seen in FIGS. 5 and 6, the portion 240 may be less than half of the circumference of the suspension rod 93. In such embodiments, the circumference of the suspension rod 93 may be partially contacted by the foam friction elements 202 and partially uncontacted by the foam friction elements 202. The foam friction elements 202 may not touch one another. For example, the foam friction elements 202 may be spaced apart about the suspension rod 93, e.g., a gap may exist between the foam friction elements 202 generally along the radial direction R.

Turning now specifically to FIG. 6, a square cross-sectional shape of the first foam friction element 202 when the first foam friction element 202 is in an uncompressed state is shown in dashed lines and superimposed on the first foam friction element 202 in a compressed state within the first trough 214 and between the suspension rod 93 and the first trough 214 which is shown in solid lines in FIG. 6. As shown, the square cross-sectional shape of the uncompressed foam friction element 202 includes four sides of equal length, e.g., the square cross-sectional shape defines a side length 246 and includes four sides each having the same side length 246. Also as may be seen in FIG. 6, a depth 242 of the first trough 214 along the radial direction R may be less than the side length 246 of the first foam friction element 202. Similarly, a depth 244 of the second trough 224 along the radial direction R may be less than a side length of the second foam friction element 202. For example, the square cross-sectional shape of the first foam friction element 202 in the uncompressed state nay be the same as the square cross-sectional shape of the second foam friction element 202 in the uncompressed state, e.g., the second foam friction element 202 may define the same side length 246 as the first foam friction element 202. Also as illustrated in FIG. 6, the first trough 214 may define a width 248 generally along the circumferential direction C and the second trough 224 may define a width 250 generally along the circumferential direction C. As may be seen in FIG. 6, in some embodiments, the width 248 of the first trough 214 may be less than the side length 246 of the first foam friction element 202. Similarly, the width 250 of the second trough 224 may be less than a side length of the second foam friction element 202. Additionally, in some embodiments, the side length 246 of the square cross-sectional shape of the first foam friction element 202 in the uncompressed state and the side length of the square cross-sectional shape of the second foam friction element 202 in the uncompressed state may each be greater than a diameter 264 of the suspension rod 93. As mentioned, in some embodiments, the side length of the second foam friction element 202 may be the same as the side length 246 of the first foam friction element 202.

Figure 7:
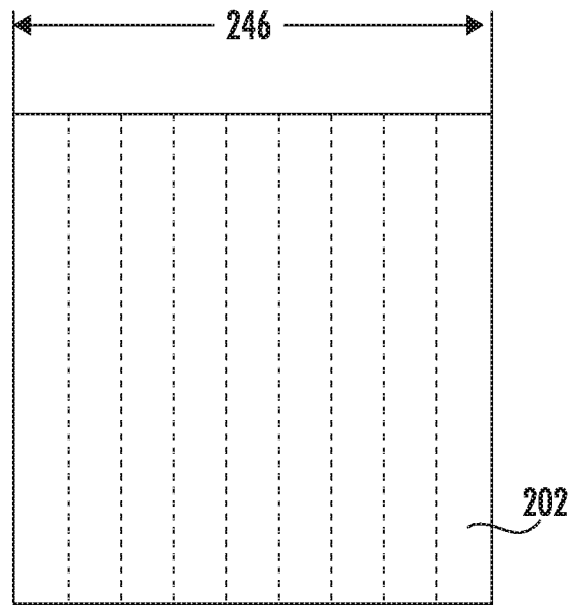
FIG. 7 provides a cross-section view of a foam friction element in accordance with one or more exemplary embodiments of the present disclosure, with the foam friction element in an uncompressed state.
Figure 8:
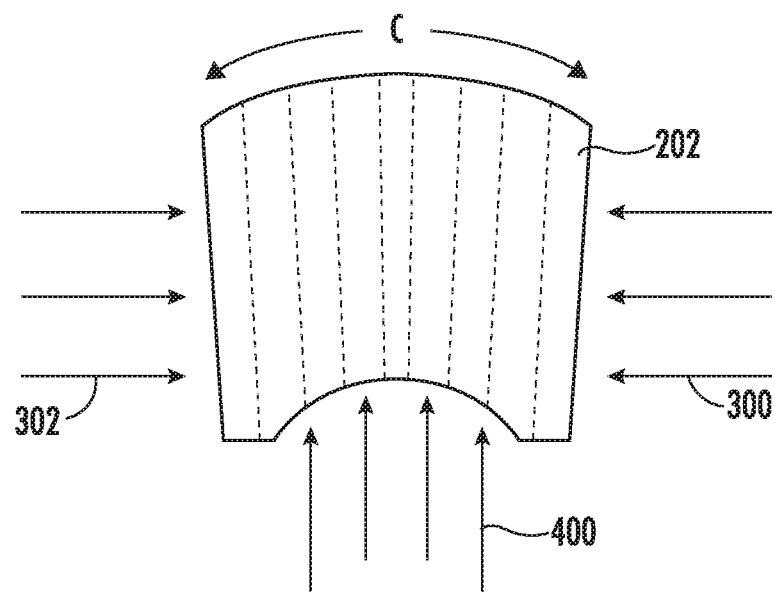
FIG. 8 provides a view of the foam friction element of FIG. 6 in a compressed state.

FIG. 7 illustrates a cross-section of a foam friction element 202 in an uncompressed state and FIG. 8 illustrates a cross-section of the same foam friction element 202 in a compressed state as installed in a damper assembly 200 such as described above. The illustrated foam friction element 202 of FIGS. 7 and 8 may be either or both of the first and second foam friction elements 202 described above. As shown by dashed lines in FIGS. 7 and 8, the foam friction elements 202 may be theoretically divided into increments or segments which are equal in width when the foam friction elements 202 are in the uncompressed state (FIG. 7), and which are concentrated along the arcuate extent of the portion 240 (FIG. 6) of the suspension rod 93 which is in contact with (and pressing on) each foam friction element 202 in the compressed state. Such concentration is due to the side-to-side compression of the foam friction elements 202, e.g., the forces 300 and 302 acting generally circumferentially on the foam friction elements 202, such as due to the compression of the foam friction elements 202 between the respective sidewalls 252 and 254 or 258 and 260 of the corresponding trough 214 or 224 in the capsule 206. Thus, the amount or proportion of the material of each foam friction element 202 which is compressed by the suspension rod 93, e.g., along the radial direction R as indicated by force arrows 400 in FIG. 8, is increased relative to the uncompressed state due to the circumferential compression of the foam friction elements 202. Collectively, the amount of deflection in the compressed state of the foam friction elements 202 in each direction, e.g., radially and circumferentially, influences, e.g., increases, the contact pressure between the foam friction elements 202 and the rod 93 along the portion 240 (FIG. 6) of the circumference of the pressure rod 93. Accordingly, the pressure against the suspension rod 93 from the foam friction elements 202 is relatively increased due to the compression of the foam friction elements 202 within the capsule 206, and, as such, the dampening force of the damper assembly 200 is increased relative to the uncompressed state of the foam friction elements 202. Moreover, the extent of the compression may be adjusted by design, e.g., based on the relative sizes of the troughs 214 and/or the suspension rod 93 compared to the size of the foam friction elements 202, such as the side length 246 of the foam friction elements 202.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dampening suspension assembly for a washing machine appliance, the washing machine appliance having a cabinet and a tub mounted within the cabinet, the dampening suspension assembly comprising:
   a suspension rod extending along an axial direction between the tub and the cabinet, the suspension rod defining a radial direction perpendicular to the axial direction and a circumferential direction extending around the axial direction; and
   a foam damper assembly circumferentially surrounding a portion of the suspension rod, the foam damper assembly comprising a capsule, the capsule comprising a first capsule portion and a second capsule portion releasably interlocked with the first capsule portion by a dovetail joint, the first capsule portion comprising a male dovetail of the dovetail joint and the second capsule portion comprising a female dovetail of the dovetail joint, the foam damper assembly further comprising a first foam friction element disposed in a first trough defined in the first capsule portion of the capsule, and a second foam friction element disposed in a second trough defined in the second capsule portion of the capsule, the second foam friction element opposite the first foam friction element along the radial direction;
   wherein the first foam friction element is compressed between opposing sidewalls of the first trough along the circumferential direction and is compressed against the suspension rod along the radial direction, and wherein the second foam friction element is compressed between opposing sidewalls of the second trough along the circumferential direction and is compressed against the suspension rod along the radial direction.

2. The dampening suspension assembly of claim 1, wherein the male dovetail is a first male dovetail and the female dovetail is a first female dovetail, further comprising a second male dovetail on the first capsule portion radially opposite the first male dovetail and a second female dovetail on the second capsule portion radially opposite the first female dovetail.

3. The dampening suspension assembly of claim 1, wherein the foam damper assembly comprises a top portion proximate the cabinet of the washing machine appliance along the axial direction and a bottom portion opposite the top portion and proximate the tub of the washing machine appliance along the axial direction, and wherein male dovetail and the female dovetail are tapered along the axial direction towards the bottom portion of the foam damper assembly.

4. The dampening suspension assembly of claim 1, wherein the first foam friction element defines a square cross-sectional shape when in an uncompressed state and the second foam friction element defines a square cross-sectional shape when in an uncompressed state.

5. The dampening suspension assembly of claim 4, wherein a depth of the first trough along the radial direction is less than a side length of the first foam friction element and a depth of the second trough along the radial direction is less than a side length of the second foam friction element.

6. The dampening suspension assembly of claim 4, wherein a width of the first trough along the circumferential direction is less than a side length of the first foam friction element and a width of the second trough along the circumferential direction is less than a side length of the second foam friction element.

7. The dampening suspension assembly of claim 4, wherein the square cross-sectional shape of the first foam friction element in the uncompressed state is the same as the square cross-sectional shape of the second foam friction element in the uncompressed state.

8. The dampening suspension assembly of claim 4, wherein a side length of the square cross-sectional shape of the first foam friction element in the uncompressed state and a side length of the square cross-sectional shape of the second foam friction element in the uncompressed state are each greater than a diameter of the suspension rod.

9. A washing machine appliance, comprising:
a cabinet;
a tub mounted within the cabinet by a dampening suspension assembly, the dampening suspension assembly comprising:
a suspension rod extending along an axial direction between the tub and the cabinet, the suspension rod defining a radial direction perpendicular to the axial direction and a circumferential direction extending around the axial direction; and
a foam damper assembly circumferentially surrounding a portion of the suspension rod, the foam damper assembly comprising a capsule, the capsule comprising a first capsule portion and a second capsule portion releasably interlocked with the first capsule portion by a dovetail joint, the first capsule portion comprising a male dovetail of the dovetail joint and the second capsule portion comprising a female dovetail of the dovetail joint, the foam damper assembly further comprising a first foam friction element disposed in a first trough defined in the first capsule portion of the capsule, and a second foam friction element disposed in a second trough defined in the second capsule portion of the capsule, the second foam friction element opposite the first foam friction element along the radial direction;
wherein the first foam friction element is compressed between opposing sidewalls of the first trough along the circumferential direction and is compressed against the suspension rod along the radial direction, and wherein the second foam friction element is compressed between opposing sidewalls of the second trough along the circumferential direction and is compressed against the suspension rod along the radial direction.

10. The washing machine appliance of claim 9, wherein the male dovetail is a first male dovetail and the female dovetail is a first female dovetail, further comprising a second male dovetail on the first capsule portion radially opposite the first male dovetail and a second female dovetail on the second capsule portion radially opposite the first female dovetail.

11. The washing machine appliance of claim 9, wherein the foam damper assembly comprises a top portion proximate the cabinet of the washing machine appliance along the axial direction and a bottom portion opposite the top portion and proximate the tub of the washing machine appliance along the axial direction, and wherein the male dovetail and the female dovetail are tapered along the axial direction towards the bottom portion of the foam damper assembly.

12. The washing machine appliance of claim 9, wherein the first foam friction element defines a square cross-sectional shape when in an uncompressed state and the second foam friction element defines a square cross-sectional shape when in an uncompressed state.

13. The washing machine appliance of claim 12, wherein a depth of the first trough along the radial direction is less than a side length of the first foam friction element and a depth of the second trough along the radial direction is less than a side length of the second foam friction element.

14. The washing machine appliance of claim 12, wherein a width of the first trough along the circumferential direction is less than a side length of the first foam friction element and a width of the second trough along the circumferential direction is less than a side length of the second foam friction element.

15. The washing machine appliance of claim 12, wherein the square cross-sectional shape of the first foam friction element in the uncompressed state is the same as the square cross-sectional shape of the second foam friction element in the uncompressed state.

16. The washing machine appliance of claim 12, wherein a side length of the square cross-sectional shape of the first foam friction element in the uncompressed state and a side length of the square cross-sectional shape of the second foam friction element in the uncompressed state are each greater than a diameter of the suspension rod.

\* \* \* \* \*